United States Patent
Ogahara et al.

(10) Patent No.: US 11,939,025 B2
(45) Date of Patent: Mar. 26, 2024

(54) STRADDLE TYPE VEHICLE AND CONTROL DEVICE

(71) Applicant: HONDA MOTOR CO., LTD., Tokyo (JP)

(72) Inventors: Atsushi Ogahara, Tokyo (JP); Yosuke Wada, Tokyo (JP); Tsubasa Nose, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 45 days.

(21) Appl. No.: 17/703,949

(22) Filed: Mar. 24, 2022

(65) Prior Publication Data

US 2022/0212747 A1    Jul. 7, 2022

Related U.S. Application Data (63) Continuation of application No. PCT/JP2020/032519, filed on Aug. 28, 2020.

(30) Foreign Application Priority Data

Sep. 27, 2019   (JP) .................................. 2019-177706

(51) Int. Cl.
*B62K 21/08*   (2006.01)
*B62J 45/412*   (2020.01)

(52) U.S. Cl.
CPC ............ *B62K 21/08* (2013.01); *B62J 45/412* (2020.02)

(58) Field of Classification Search
CPC ............................... B62K 21/08; B62J 45/412
See application file for complete search history.

(56) References Cited

U.S. PATENT DOCUMENTS

| 4,773,514 | A | * | 9/1988 | Gustafsson | ............... F16F 9/34 280/90 |
| 4,800,751 | A | * | 1/1989 | Kobayashi | ........... B60G 15/068 73/117.03 |
| 6,637,558 | B2 | * | 10/2003 | Oliver | ..................... F16F 9/535 280/90 |
| 6,742,794 | B2 | * | 6/2004 | Bunya | ..................... F16F 9/466 280/272 |
| 7,044,489 | B2 | * | 5/2006 | Bunya | ..................... F16F 9/145 180/219 |

(Continued)

FOREIGN PATENT DOCUMENTS

| JP | 2010-228621 A | 10/2010 |
| WO | 2012/153527 A1 | 11/2012 |

(Continued)

OTHER PUBLICATIONS

International Search Report for PCT/JP2020/032519 dated Sep. 24, 2020 with partial English Translation.

*Primary Examiner* — Luis A Martinez Borrero
(74) *Attorney, Agent, or Firm* — Thomas| Horstemeyer, LLP (57) ABSTRACT

A straddle type vehicle comprises a steering mechanism configured to steer a front wheel a steering damper device capable of variably generating a damping force working on a rotating action of the steering mechanism; and a control unit configured to control the damping force of the steering damper device to increase, when the front wheel of the straddle type vehicle in a wheelie state lands on a ground. The control unit controls the damping force to increase, after the front wheel lands on the ground and an oscillation occurs in the steering mechanism.

7 Claims, 8 Drawing Sheets

(56) References Cited

U.S. PATENT DOCUMENTS

| | | | |
|---|---|---|---|
| 7,306,248 B2* | 12/2007 | Gogo | F16F 9/064 |
| | | | 280/90 |
| 8,056,918 B2* | 11/2011 | Miyashiro | B62K 21/08 |
| | | | 280/272 |
| 9,120,527 B2* | 9/2015 | Harazono | B62K 21/08 |
| 9,126,652 B2 | 9/2015 | Matsuo et al. | |
| 9,233,729 B2 | 1/2016 | Harazono et al. | |
| 10,940,911 B2* | 3/2021 | Panzani | B62K 21/08 |
| 2002/0152832 A1* | 10/2002 | Hasegawa | F16F 9/145 |
| | | | 74/551.8 |
| 2002/0157909 A1* | 10/2002 | Hasegawa | F16F 9/125 |
| | | | 188/290 |
| 2005/0173911 A1* | 8/2005 | Takeuchi | F16F 9/145 |
| | | | 280/771 |
| 2006/0207845 A1* | 9/2006 | Gogo | B62K 21/08 |
| | | | 188/290 |
| 2007/0216124 A1* | 9/2007 | Wakabayashi | B62K 21/08 |
| | | | 188/290 |
| 2009/0043452 A1* | 2/2009 | Sekiya | F16F 9/535 |
| | | | 701/40 |
| 2009/0302557 A1* | 12/2009 | Hara | F16F 9/125 |
| | | | 180/219 |
| 2011/0036656 A1* | 2/2011 | Nicoson | B62M 7/00 |
| | | | 180/220 |
| 2012/0065825 A1* | 3/2012 | Nicoson | B62M 23/02 |
| | | | 180/197 |
| 2013/0041541 A1* | 2/2013 | Kageyama | B60L 15/2036 |
| | | | 701/99 |
| 2014/0058626 A1 | 2/2014 | Harazono et al. | |
| 2014/0058627 A1* | 2/2014 | Harazono | B62K 21/08 |
| | | | 701/41 |
| 2015/0081172 A1 | 3/2015 | Matsuo et al. | |
| 2019/0127013 A1* | 5/2019 | Panzani | B62K 21/08 |
| 2019/0210644 A1* | 7/2019 | Uchiyama | B62J 45/414 |
| 2019/0389267 A1* | 12/2019 | Kojima | B60G 13/08 |
| 2020/0047739 A1* | 2/2020 | Grelaud | B60W 10/20 |
| 2022/0212746 A1* | 7/2022 | Ogahara | B62K 21/08 |

FOREIGN PATENT DOCUMENTS

| | | |
|---|---|---|
| WO | 2013/168422 A1 | 11/2013 |
| WO | 2021059856 A1 | 4/2021 |

* cited by examiner

STRADDLE TYPE VEHICLE AND CONTROL DEVICE

CROSS-REFERENCE TO RELATED APPLICATION

This application is a continuation of International Patent Application No. PCT/JP2020/032519 filed on Aug. 28, 2020, which claims priority to and the benefit of Japanese Patent Application No. 2019-177706 filed on Sep. 27, 2019, the entire disclosure of which is incorporated herein by reference.

BACKGROUND OF THE INVENTION

Field of the Invention

The present invention relates to a straddle type vehicle and a control device.

Description of the Related Art

A straddle type vehicle provided with a steering damper is known. International Publication No. 2013/168422 discloses a technique for suppressing a vibration of a steering mechanism by controlling a damping force of a steering damper, based on a state of a vehicle, such as a load applied to a front wheel and a steering angle of the steering mechanism.

SUMMARY OF THE INVENTION

According to an embodiment of the present invention, there is provided a straddle type vehicle comprising:
 a steering mechanism configured to steer a front wheel;
 a steering damper device capable of variably generating a damping force working on a rotating action of the steering mechanism; and
 a control unit configured to control the damping force of the steering damper device to increase, when the front wheel of the straddle type vehicle in a wheelie state lands on a ground, wherein
 the control unit controls the damping force to increase, after the front wheel lands on the ground and an oscillation occurs in the steering mechanism.

According to another embodiment of the present invention, there is provided a control device to be applied to a straddle type vehicle, the straddle type vehicle including a steering mechanism that steers a front wheel and a steering damper device capable of variably generating a damping force working on a rotating action of the steering mechanism, the control device being configured to control the damping force of the steering damper device to increase, when the front wheel of the straddle type vehicle in a wheelie state lands on a ground, wherein
 the control device controls the damping force to increase, after the front wheel lands on the ground and an oscillation occurs in the steering mechanism.

DESCRIPTION OF THE EMBODIMENTS

A straddle type vehicle, by the way, may become in a wheelie state in which the front wheel is separated from the ground during traveling. When the front wheel lands on the ground from the wheelie state, the steering mechanism may oscillate in some cases, and there is a demand for suppressing such an oscillation.

An embodiment of the present invention provides a technique for suppressing an oscillation of a steering mechanism after wheelie landing.

Hereinafter, embodiments will be described in detail with reference to the attached drawings. Note, the following embodiments are not intended to limit the scope of the claimed invention, and limitation is not made to an invention that requires a combination of all features described in the embodiments. Two or more of the multiple features described in the embodiments may be combined as appropriate. Furthermore, the same reference numerals are given to the same or similar configurations, and redundant description thereof is omitted.

In addition, in each drawing, arrows X and Y indicate horizontal directions orthogonal to each other, and an arrow Z indicates a vertical direction. In the following description, the traveling direction of the vehicle is defined as X direction, which is set to a front-and-rear direction, and the front and the rear are defined. In addition, a vehicle width direction of the vehicle is defined as Y direction, which is set to a left-and-right direction with a forward direction of the vehicle as a reference, and the left and the right are defined.

First Embodiment

Outline of Straddle Type Vehicle

Figure 1:
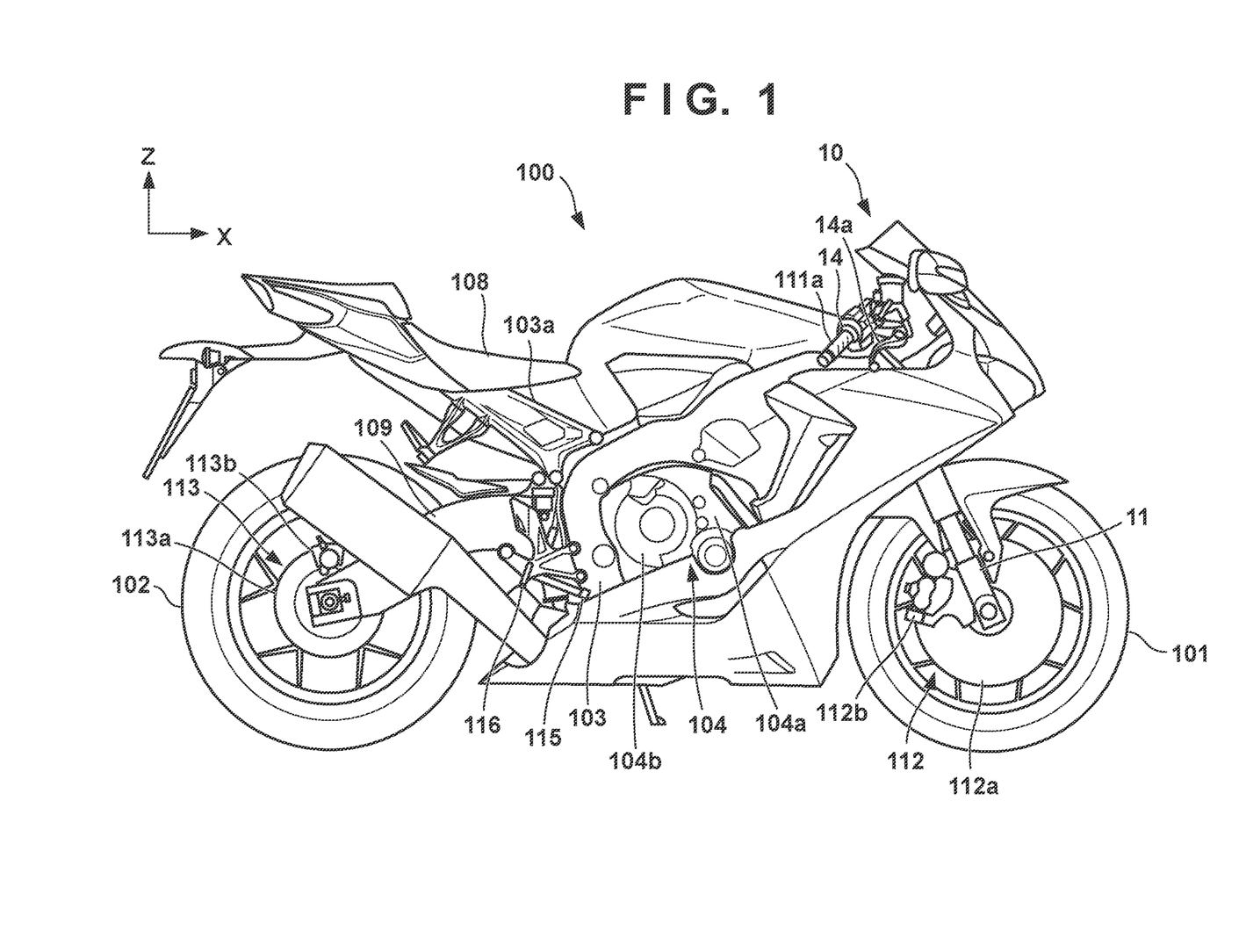
FIG. 1 is a side view of a vehicle according to one embodiment.
Figure 2:
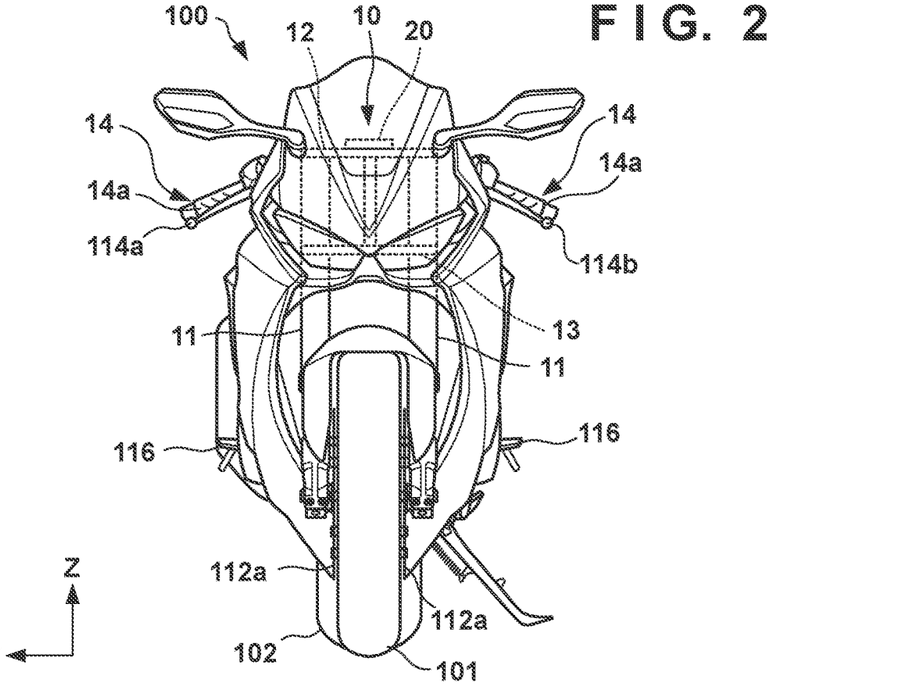
FIG. 2 is a front view of the vehicle of FIG. 1.

FIG. 1 is a side view (a right side view) of a straddle type vehicle 100 according to one embodiment, and FIG. 2 is a front view of the vehicle 100, illustrating an outline of the vehicle 100. FIGS. 1 and 2 respectively illustrate a side view and a front view in a state in which the vehicle 100 stands in a vertical posture. For the vehicle 100 in the present embodiment, a motorcycle including a front wheel 101 and a rear wheel 102 is given as an example, but the present invention is also applicable to any other type of the straddle type vehicle.

The vehicle 100 includes a vehicle body frame 103 forming its backbone. A power unit 104 that drives the rear wheel 102 is supported at the vehicle body frame 103. The power unit 104 includes an engine 104a (for example, a multi-cylinder four-cycle engine) and a transmission 104*b* that changes an output from the engine 104*a*, and the output from the transmission 104*b* is transmitted by a chain transmission mechanism to the rear wheel 102.

A seat frame 103*a* that supports a seat 108 on which the rider is seated is coupled with a rear portion of the vehicle body frame 103. A swing arm 109 is swingably supported by the rear portion of the vehicle body frame 103, and the rear wheel 102 is rotatably supported by the swing arm 109.

A head pipe is provided in a front portion of the vehicle body frame 103. The head pipe rotatably supports a steering mechanism 10.

The steering mechanism 10 steers the front wheel 101, and includes a pair of front forks 11, a top bridge 12, a bottom bridge 13, and left and right handlebars 14. The pair of front forks 11 are rotatably supported by the head pipe. The pair of front forks 11 are coupled at upper end portions by the top bridge 12, and are coupled by the bottom bridge 13 below the top bridge 12. A steering stem (not illustrated) is attached to extend between the top bridge 12 and the bottom bridge 13, and the steering stem is rotatably attached in the head pipe.

In upper portions of the pair of front forks 11, separate-type left and right handlebars 14 for steering the front wheel 101 are provided, and the handlebars 14 are each provided with a grip 14*a* to be gripped by the rider. The left and right handlebars 14 are disposed to be inclined downward toward the outside in the vehicle width direction in a vehicle front view, and are disposed for the rider to easily get on the vehicle in a forward inclined posture.

The vehicle 100 includes braking devices 112 and 113. The braking device 112 is a braking device for the front wheel 101, and includes a brake disc 112*a* provided on the front wheel 101 and a brake caliper 112*b* supported by the front fork 11. The right handlebar 14 is provided with a brake lever 114*a* for operating the brake caliper 112*b*. The left handlebar 14 is provided with a clutch lever 114*b* for operating the clutch of the transmission 104*b*.

The braking device 113 is a braking device for the rear wheel 102, and includes a brake disc 113*a* provided on the rear wheel 102 and a brake caliper 113*b* supported by the swing arm 109. A brake pedal 115 for operating the brake caliper 113*b* is provided on a right side portion of the vehicle 100. Steps 116 on which the rider places its legs are respectively provided on the left and the right side portions of the vehicle 100. A brake pedal 115 is disposed near the step 116 on the right side, and a shift pedal, not illustrated, is disposed near the step 116 on the left side.

Configuration of Steering Damper

Figure 3:
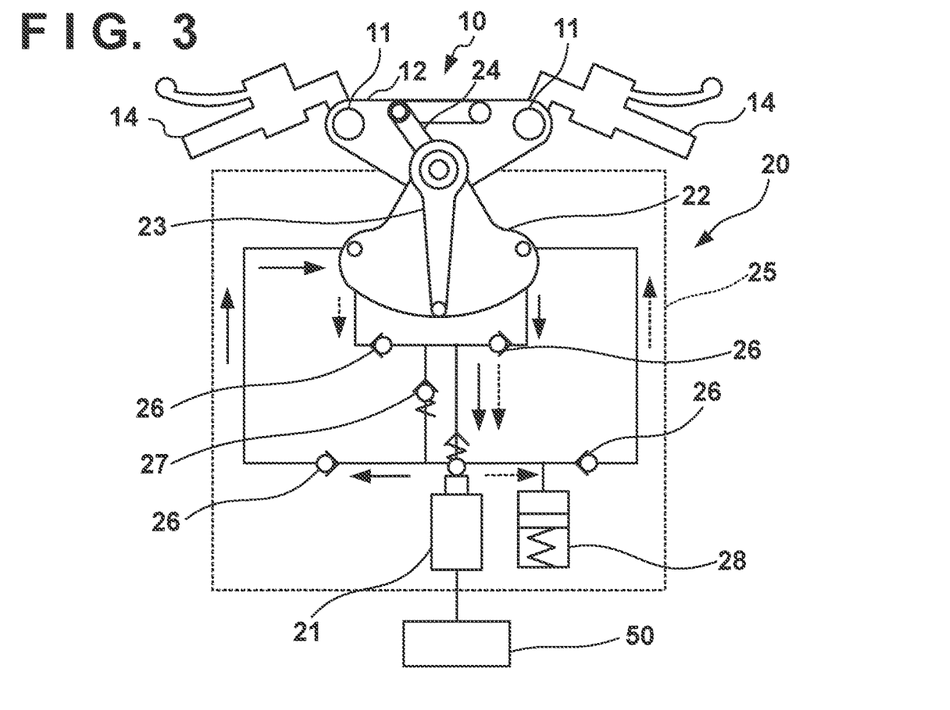
FIG. 3 is a schematic view illustrating a configuration of a steering damper device according to one embodiment.

FIG. 3 is a schematic view illustrating a configuration of a steering damper device 20. The steering damper device 20 is a device capable of variably generating the damping force working on a rotating action of the steering mechanism 10. For example, in order to reduce a so-called kickback (reaction) that is a sudden oscillation of the handlebars 14, when an external force from the road surface during traveling works on the front wheel 101, the steering damper device 20 generates the damping force against the oscillation.

In the present embodiment, the steering damper device 20 is an electronically controlled steering damper, and is capable of variably controlling the damping force by controlling the drive current of a solenoid valve 21.

The steering damper device 20 is a hydraulic rotary type in which a swingable vane 23 is disposed in an oil chamber 22 having a fan shape in a plan view, and uses, as the damping force, a flow resistance of hydraulic oil in the oil chamber 22 generated when the vane 23 swings. The top bridge 12 is coupled through a link mechanism 24 with a base portion of the vane 23.

The steering damper device 20 includes a hydraulic control circuit 25. The hydraulic control circuit 25 includes the solenoid valve 21. The solenoid valve 21 is driven by a control unit 50 to be described later. The control unit 50 drives the solenoid valve 21 to change the opening area of the valve and change the flow resistance of the hydraulic oil. That is, the control unit 50 controls the drive current of the solenoid valve 21 to control the damping force generated by the steering damper device 20. The hydraulic control circuit 25 also includes a check valve 26, a relief valve 27, and an accumulator 28. Solid arrows in the drawing each indicate a flow of the hydraulic oil when the steering mechanism 10 makes a turn to the left. Furthermore, dotted arrows in the drawing each indicate a flow of the hydraulic oil when the steering mechanism 10 makes a turn to the right.

Note that, in the present embodiment, the configuration of the steering damper device 20 is given as an example, and any other known configuration is adoptable. For example, the steering damper device 20 may be a cylinder type.

Control Configuration

Figure 4:
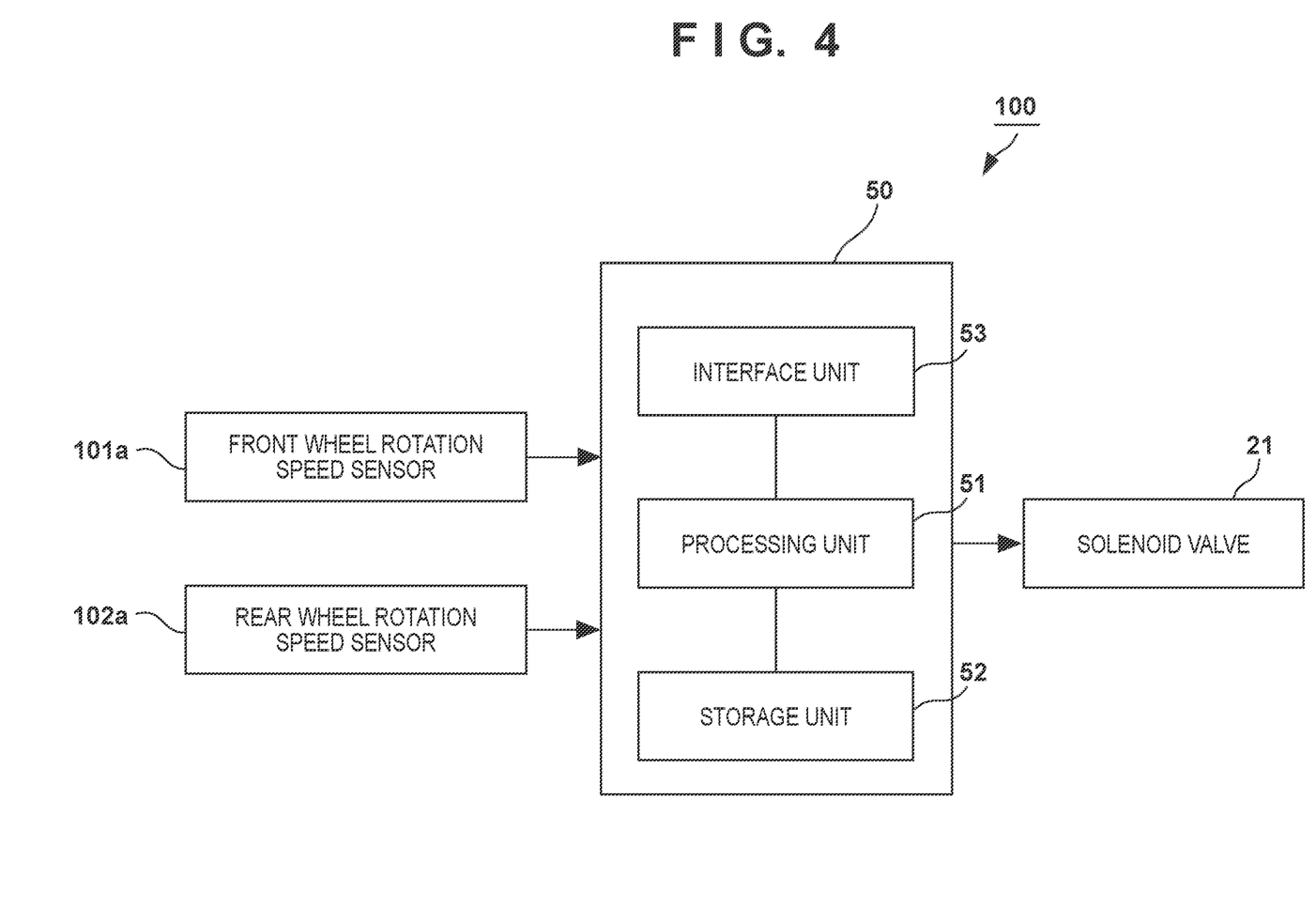
FIG. 4 is a block diagram illustrating an example of a control configuration of the straddle type vehicle according to one embodiment.

FIG. 4 is a block diagram illustrating an example of a control configuration of the vehicle 100. FIG. 4 mainly illustrates a configuration necessary in relation to the present embodiment to be described later.

The vehicle 100 includes the control unit 50 configured with an electric control unit (ECU) or the like. The control unit 50 includes a processing unit 51, a storage unit 52 such as a RAM and a ROM, and an interface unit 53 (I/F unit) that relays transmission and reception of signals between an external device and the processing unit 51. The processing unit 51 is a processor represented by a CPU, and executes a program stored in the storage unit 52. In the storage unit 52, data and the like used by the processing unit 51 for processing, in addition to the program executed by the processing unit 51, are stored.

In the present embodiment, the control unit 50 controls the damping force of the steering damper device 20. More specifically speaking, the control unit 50 controls the damping force of the steering damper device 20 to increase, when the vehicle 100 returns to a state in which the front wheel 101 lands on the ground from the wheelie state.

Note that the control unit 50 may include a plurality of electric control units (ECUs), and each of them may include a processor, a storage device, and an external I/F. For example, the control unit 50 may include a drive controlling ECU that controls driving of the power unit 104 and a damping force controlling ECU that controls the damping force of the steering damper device 20. Note that the number of ECUs and the functions assigned to the respective ECUs can be designed as appropriate, and can be subdivided or integrated as compared with the above example.

The vehicle 100 includes a front wheel rotation speed sensor 101*a* that detects the rotation speed of the front wheel 101, and a rear wheel rotation speed sensor 102*b* that detects the rotation speed of the rear wheel 102. As will be described later, the control unit 50 determines a control current value of the solenoid valve 21, based on detection results of these sensors.

Process Example of Control Unit

Figure 5:
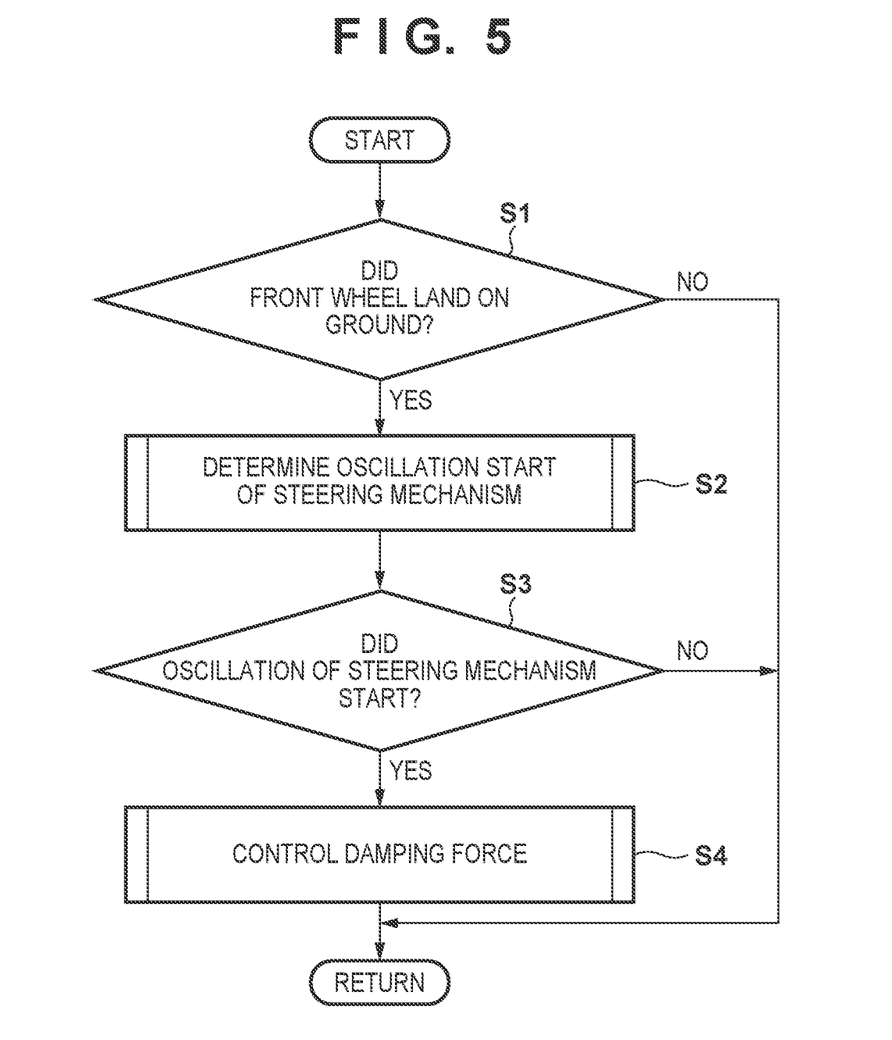
FIG. 5 is a flowchart illustrating a process example of a control unit according to one embodiment.
Figure 6A:
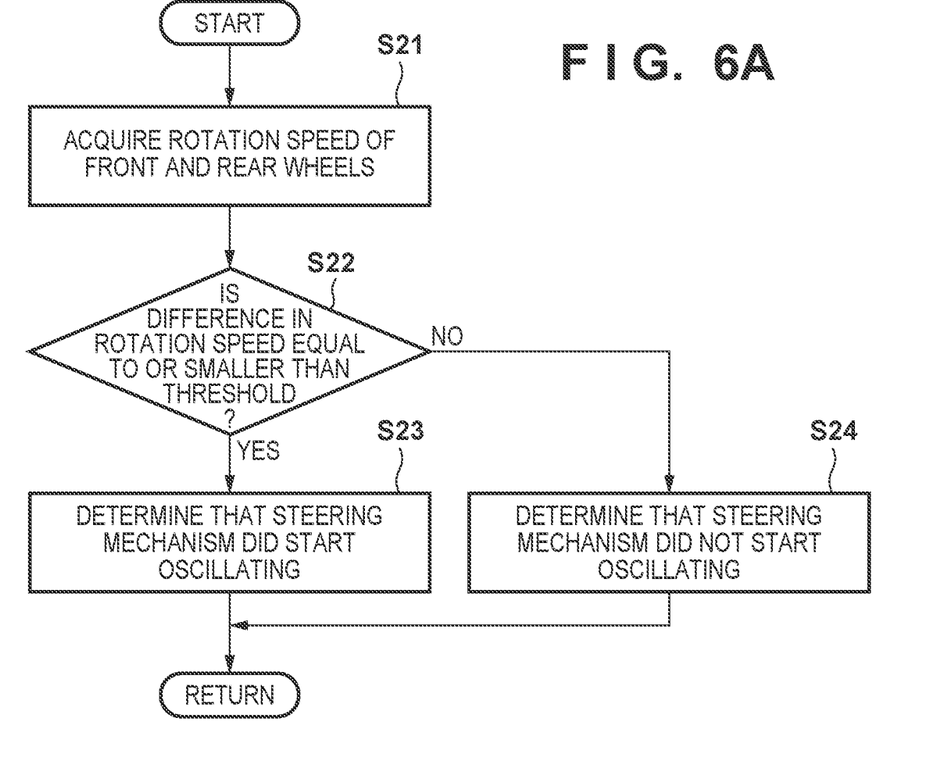
FIG. 6A is a flowchart illustrating a process example of the control unit according to one embodiment.
Figure 6B:
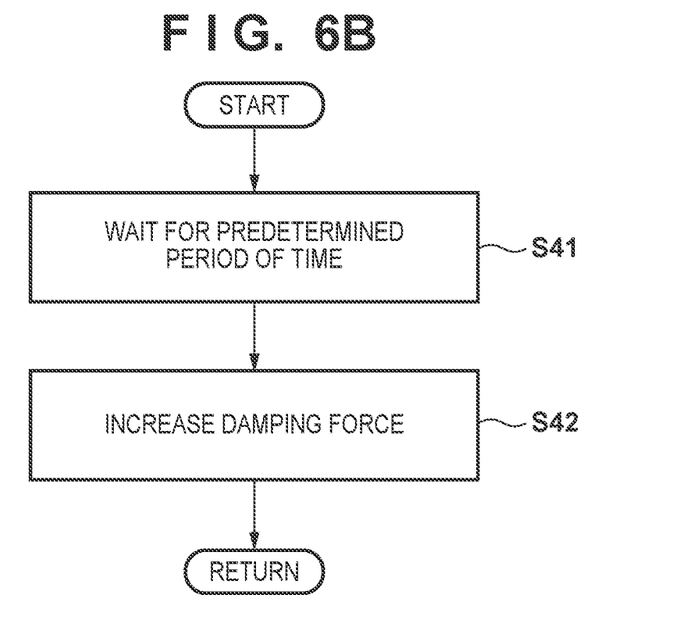
FIG. 6B is a flowchart illustrating a process example of the control unit according to one embodiment.

A process example of the control unit 50 will be described. FIGS. 5 to 6B are flowcharts each illustrating an example of a process performed by the control unit 50. These process examples are process examples for damping force control of the steering damper device 20 to be conducted by the control unit 50. More specifically, FIGS. 5 to 6B are each an example of the damping force control, of the steering damper device 20 at the time of wheelie landing, to be conducted by the control unit 50. For example, the control unit 50 determines whether the vehicle 100 is in the wheelie state in a process different from the present process, and repeatedly performs the present process while determining that the vehicle 100 is in the wheelie state. Note that the control unit 50 may determine whether the vehicle is in the wheelie state, based on, for example, a difference or the like in the rotation speed between the front and rear wheels. In addition, the magnitude of the damping force in the wheelie state is set to an initial value, and such an initial value can be appropriately set, based on the configuration or the like of the vehicle 100 or the steering damper device 20.

In S1, the control unit 50 determines whether the front wheel 101 of the vehicle 100 in the wheelie state has landed on the ground. In a case of determining that the front wheel 101 has landed on the ground, the control unit 50 advances the process to S2, whereas in a case of determining that the front wheel has not landed on the ground, the control unit 50 ends the flowchart.

The control unit 50 determines whether the front wheel 101 has landed on the ground, based on, for example, a detection result of the front wheel rotation speed sensor 101a. For example, in the wheelie state in which the front wheel 101 is separated from the ground, the front wheel 101 gradually decreases. However, when the front wheel 101 lands on the ground, its rotation speed starts to increase. Therefore, the control unit 50 may determine that the front wheel 101 has landed on the ground, when the rotation speed of the front wheel 101 starts to increase in the case where it is determined that the vehicle 100 is in the wheelie state. Further, for example, in a case where the vehicle 100 has a configuration capable of detecting a load generated on the front wheel 101, the control unit 50 may determine whether the front wheel 101 has landed on the ground, based on a change in the load.

In S2, the control unit 50 makes an oscillation start determination of the steering mechanism 10. In S3, in a case of determining that the steering mechanism 10 has started oscillating in S2, the control unit 50 advances the process to S4, whereas in a case of determining that the steering mechanism has not started oscillating, the control unit 50 ends the flowchart.

In S4, the control unit 50 conducts the damping force control of the steering damper device 20. Then, the control unit 50 ends the flowchart.

Here, as an aspect of the damping force control of the steering damper device 20, it is conceivable that when the front wheel 101 lands on the ground from the wheelie state, the damping force is increased beforehand before the steering mechanism 10 starts oscillating, or the damping force is increased simultaneously with the start of the oscillation. However, the oscillation for the first time (a first oscillation) when the steering mechanism 10 starts oscillating cannot be suppressed effectively by an increase in the damping force, in some cases. In addition, when the damping force is caused to generate against the first oscillation, an impact is input into the vehicle body. This may lead to a swing of the vehicle body, and may affect the riding feeling, in some cases. In the present embodiment, in the process of FIG. 5, after the front wheel 101 lands on the ground from the wheelie state and then the steering mechanism 10 starts oscillating, the control unit 50 controls the damping force of the steering damper device 20 to increase. Accordingly, after the steering mechanism 10 starts oscillating, the damping force starts to increase. Therefore, it is possible to suppress the oscillation of the steering mechanism 10, while suppressing the swing of the vehicle body and an unnatural vehicle body behavior and improving the riding feeling.

FIG. 6A illustrates a process example of determining whether the oscillation has occurred in the steering mechanism 10 in S2 in the flowchart of FIG. 5. As described above, in the wheelie state, a difference in the rotation speed may be occurring between the front wheel 101 and the rear wheel 102, in some cases. In addition, the oscillation of the steering mechanism 10 may occur in some cases, after the front wheel 101 lands on the ground from the wheelie state, in a case where the difference in the rotation speed between the front wheel 101 and the rear wheel 102 disappears, or in a case where the difference in the rotation speed decreases. Therefore, in the present embodiment, the occurrence of the oscillation of the steering mechanism 10 is determined, based on the difference in the rotation speed between the front wheel 101 and the rear wheel 102.

In S21, the control unit 50 acquires the respective rotation speeds of the front wheel 101 and the rear wheel 102, based on detection results of the front wheel rotation speed sensor 101a and the rear wheel rotation speed sensor 102b.

In S22, in a case where the difference in the rotation speed between the front wheel 101 and the rear wheel 102 is equal to or smaller than a threshold, the control unit 50 advances the process to S23, and determines that the steering mechanism 10 starts oscillating. On the other hand, in a case where the difference in the rotation speed between the front wheel 101 and the rear wheel 102 is larger than the threshold, the control unit 50 advances the process to S24, and determines that the steering mechanism 10 has not started oscillating.

Through the above process, the control unit 50 is capable of determining whether the steering mechanism 10 has started oscillating.

FIG. 6B illustrates a process example of the damping force control (S4 in the flowchart of FIG. 5) of the steering damper device 20 to be conducted by the control unit 50.

As described above, even when the damping force is generated against the oscillation for the first time (the first oscillation) after the wheelie landing, the vibration of the steering mechanism 10 cannot be effectively suppressed, in some cases. Therefore, in the present embodiment, the control unit 50 increases the damping force after a predetermined period of time has lapsed since the determination that the steering mechanism 10 starts oscillating. Accordingly, the damping force of the steering damper device 20 is generated, when the steering mechanism 10 oscillates on an opposite side (a second oscillation) to the first oscillation. Hereinafter, a specific process example will be described.

In S41, the control unit 50 waits for a predetermined period of time. In S42, the control unit 50 increases the damping force of the steering damper device 20.

The magnitude of the damping force after the increase can be appropriately set. As an example, the magnitude of the damping force after the increase may be determined before the increase, that is, within a range of 1.5 to 10 times the initial value. Note that in the present embodiment, the damping force of the steering damper device 20 is changed by the drive of the solenoid valve 21. Therefore, the control unit 50 controls the drive current of the solenoid valve 21 to control the damping force. For example, the control unit 50 increases the drive current of the solenoid valve 21 to increase the damping force.

Here, the vibration cycle when the steering mechanism 10 is oscillated depends on the inertia of the steering mechanism 10 and the front wheel 101. Therefore, the predetermined period of time in S41 can be appropriately set, based on the configuration of the vehicle body such as the weights of the steering mechanism 10 and the front wheel 101. As an example, the predetermined period of time in S41 may be determined within a range of 30 msec to 70 msec. In addition, as an example, the predetermined period of time in S41 may be determined within a range of 40 msec to 60 msec. More specifically speaking, the predetermined period of time in S41 may be, for example, 50 msec.

Further, in the process of S42, the control unit 50 may gradually increase the damping force of the steering damper device 20. That is, the control unit 50 may increase the drive current of the solenoid valve 21 at a constant rate. This enables suppression of the oscillation of the vehicle 100, while suppressing the unnatural vehicle behavior due to a sudden increase of the damping force. The control unit 50 may hold the drive current for a predetermined period of time after the drive current of the solenoid valve 21 rises to a target value, and then may lower the drive current at a constant rate. The period of time for increasing, holding, or decreasing the damping force can be appropriately set in accordance with the configuration of the vehicle 100 or the like. As an example, the rising period of time may be 10 to 40 msec, the holding period of time may be 50 to 200 msec, and the decreasing period of time may be 30 to 70 msec.

Figure 7:
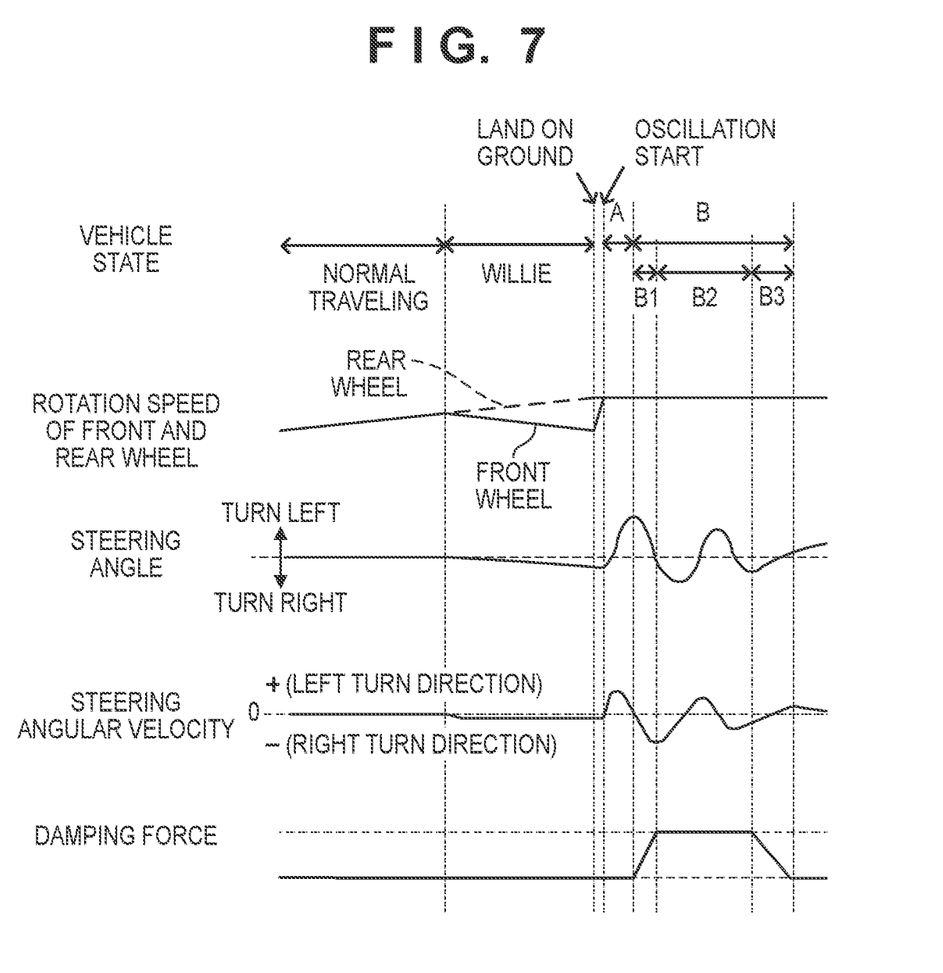
FIG. 7 is a timing chart illustrating a state of the vehicle in a case where the processes of FIGS. 5 to 6B are performed.

FIG. 7 is a timing chart illustrating a state and the like of the vehicle 100, when the processes of FIGS. 5 to 6B are performed. Regarding the steering angle in the drawing, an upper side from the center broken line indicates a steering angle in a case of making a turn to the left, and a lower side from the center broken line indicates a steering angle in a case of making a turn to the right. In addition, regarding the steering speed (angular velocity) in the drawing, the angular velocity on the left turn side is positive, and the angular velocity on the right turn side is negative.

In normal traveling that the vehicle 100 is not in the wheelie state, the rotation speeds of the front wheel 101 and the rear wheel 102 are substantially the same. On the other hand, when the vehicle 100 becomes in the wheelie state, the front wheel 101 rotates by inertia, and the rotation speed of the front wheel 101 gradually decreases. As a result, a difference occurs in the rotation speed between the front wheel 101 and the rear wheel 102.

When the front wheel 101 lands on the ground with the difference in the rotation speed between the front wheel 101 and the rear wheel 102, the rotation speed of the front wheel 101 returns to almost the same level as the rotation speed of the rear wheel 102. Here, in a case where the steering mechanism 10 oscillates either to the left or right when the front wheel 101 lands on the ground, the steering mechanism 10 starts oscillating, when the rotation speed of the front wheel 101 returns to almost the same level as the rotation speed of the rear wheel 102. In FIG. 7, the steering mechanism 10 makes a turn to the right side, when the front wheel 101 lands on the ground. Therefore, after the rotation speed of the front wheel 101 returns to almost the same level as the rotation speed of the rear wheel 102, the oscillation of the steering mechanism 10 occurs.

The above-described first oscillation is occurring for a predetermined period of time since the steering mechanism 10 starts oscillating, and the control unit 50 maintains the damping force of the steering damper device 20 during such a period of time (S41 in FIG. 6B, section A in FIG. 7). After a predetermined period of time lapses, the control unit 50 gradually increases the damping force of the steering damper device 20 (section B1). Then, the control unit 50 holds the damping force of the steering damper device 20 for a predetermined period of time (section B2). The control unit 50 gradually increases and then holds the damping force of the steering damper device 20 so as to be capable of generating a high damping force in a region where the amplitude of the above-described second oscillation is large. Furthermore, after that, the control unit 50 gradually reduces the damping force of the steering damper device 20 (section B3). This enables the control unit 50 to reduce the damping force, while suppressing an occurrence of the unnatural vehicle body behavior of the vehicle 100 due to a sudden decrease of the damping force, and improving the riding feeling.

As described heretofore, according to the present embodiment, the control unit 50 controls the damping force of the steering damper device 20 to increase the damping force, after the vehicle 100 becomes in the state in which the front wheel 101 lands on the ground from the wheelie state, and the oscillation occurs in the steering mechanism 10. This enables suppression of the vibration of the steering mechanism 10, while suppressing the vehicle body vibration and an occurrence of the unnatural vehicle body behavior and improving the riding feeling. Therefore, the vibration of the steering mechanism 10 after the wheelie landing can be suppressed in a more effective manner.

Second Embodiment

Figure 8:
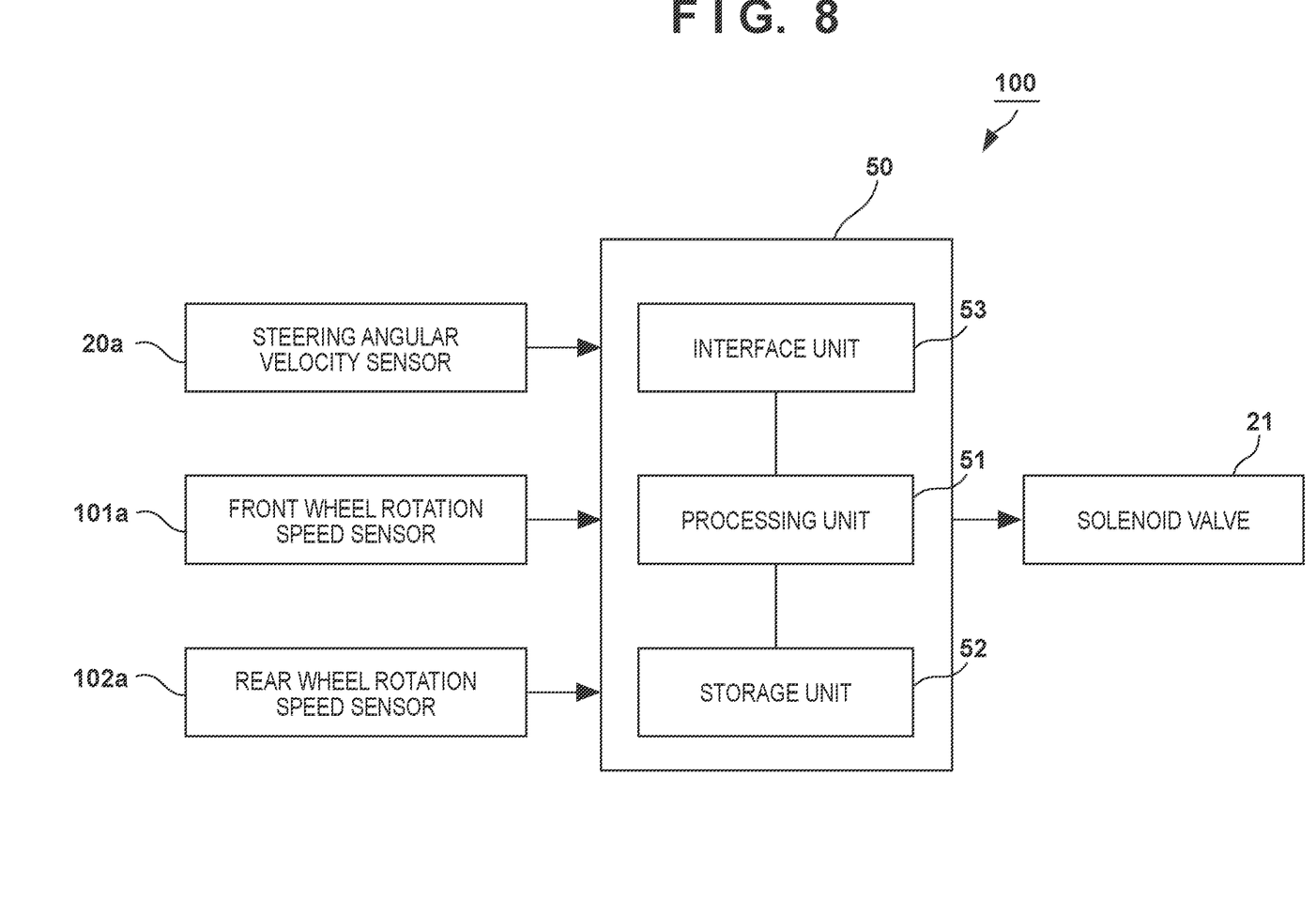
FIG. 8 is a block diagram illustrating an example of a control configuration of the straddle type vehicle according to one embodiment.

FIG. 8 is a block diagram illustrating an example of a control configuration of the vehicle 100 according to a second embodiment. The present embodiment is different from the first embodiment in that the vehicle 100 includes a steering angular velocity sensor 20a. In the following description, the same components as those of the first embodiment are denoted by the same reference numerals, and the descriptions will be omitted.

The steering angular velocity sensor 20a detects a steering angular velocity around a steering stem that is a rotation shaft of the steering mechanism 10, as information relate to a steering angle of the steering mechanism 10. As the steering angular velocity sensor 20a, a potentiometer, an encoder, or any other known configuration is adoptable. In addition, the steering angular velocity sensor 20a may be capable of directly detecting the steering angular velocity, or may be capable of detecting the steering angle. In a case where the steering angular velocity sensor 20a detects the steering angle, the control unit 50 may differentiate the steering angle based on a detection result to acquire the steering angular velocity.

Figure 9:
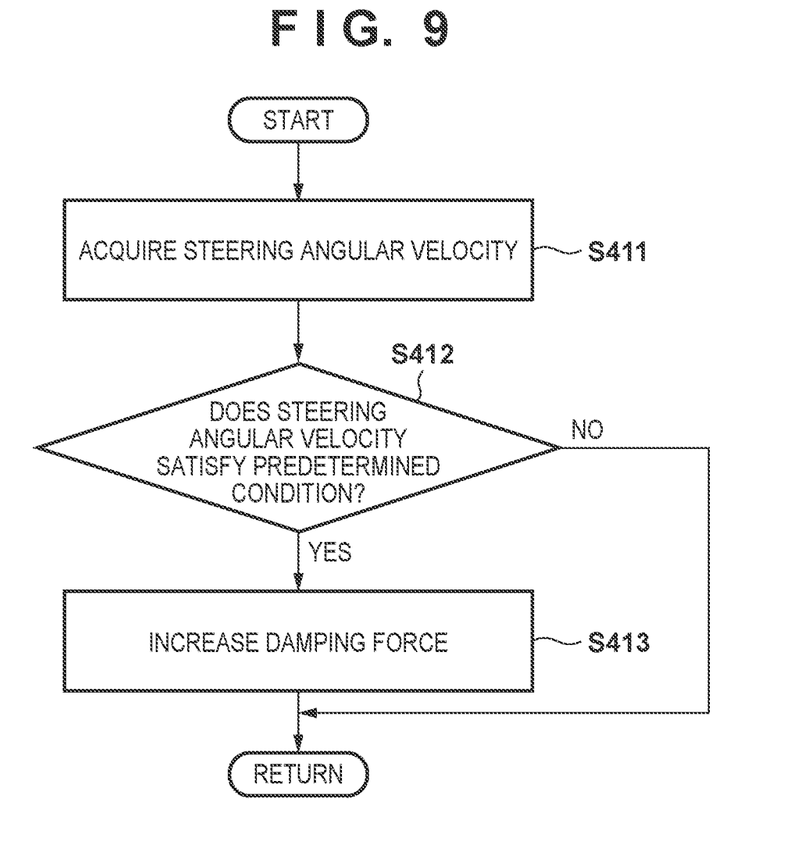
FIG. 9 is a flowchart illustrating a process example of the control unit according to one embodiment.

FIG. 9 is a flowchart illustrating an example of damping force control of the steering damper device 20 according to the second embodiment, and illustrates a process example (corresponding to the process of S4 in FIG. 5) in a case where the damping force is controlled, based on the detection result of the steering angular velocity sensor 20a. In the first embodiment, the damping force is increased after a predetermined period of time has lapsed since the steering mechanism 10 starts oscillating (S41). However, in the second embodiment, the damping force is increased in a case where the steering angular velocity satisfies a predetermined condition after the steering mechanism 10 starts oscillating.

In S411, the control unit 50 acquires the steering angular velocity, based on the detection result of the steering angular velocity sensor 20a. In S412, the control unit 50 determines whether the steering angular velocity acquired in S411 satisfies a predetermined condition. In a case where the steering angular velocity satisfies the predetermined condition, the control unit 50 advances the process to S413, whereas in a case where the steering angular velocity does not satisfy the predetermined condition, the control unit 50 ends the flowchart. The process of S413 is similar to the process of S42.

As an example, the predetermined condition in S412 may be whether the steering angle of the first oscillation of the steering mechanism 10 becomes equal to or larger than a predetermined value and the velocity direction of the steering angular velocity in the first oscillation has been reversed. A description will be given with reference to FIG. 8. The steering angular velocity changes from positive (turn to a left direction) to negative (turn to a right direction) at a timing proceeding from the section A to the section B1, and the velocity direction of the steering angular velocity has been reversed. That is, it can be said that the process proceeds from the first oscillation to the second oscillation. By starting to increase the damping force at this timing, the damping force can be increased at the timing when the second oscillation becomes large. Therefore, the vibration of the steering mechanism 10 can be suppressed in a more effective manner.

As described above, according to the present embodiment, the information related to the steering angle of the steering mechanism 10 is directly acquirable by the steering angular velocity sensor 20a. Therefore, the control unit 50 is capable of increasing the damping force at a more effective timing.

Other Embodiments

In the above embodiments, the power unit 104 is an engine. However, a configuration including an electric motor as the power unit 104 or a configuration including both an internal combustion engine and an electric motor is also adoptable. That is, the vehicle 100 may be an electric vehicle or a hybrid vehicle.

In the above embodiments, the description has been given by focusing on the damping force control of the steering damper device 20 to be conducted by the control unit 50, at the time of wheelie landing. However, the control unit 50 may conduct the damping force control of another steering damper device 20 in parallel, in addition to the damping force control at the time of the wheelie landing. For example, the control unit 50 may conduct the damping force control (referred to as another type of damping force control) of the steering damper device 20, based on a traveling state such as the speed, the acceleration, or the like of the vehicle 100. Then, the control unit 50 may control the damping amount of the steering damper device 20 such that the maximum value of the target value of the damping force based on the damping force control at the time of the wheelie landing and the target value of the damping force based on another type of damping force control becomes the actual damping force of the steering damper device 20.

Summary of Embodiments

The above-described embodiments disclose at least a work machine to be described as follows.

1. A straddle type vehicle (1) of the above embodiments comprises:
a steering mechanism (10) configured to steer a front wheel;
a steering damper device (20) capable of variably generating a damping force working on a rotating action of the steering mechanism; and
a control unit (50) configured to control the damping force of the steering damper device to increase, when the front wheel of the straddle type vehicle in a wheelie state lands on a ground, wherein
the control unit controls the damping force to increase, after the front wheel lands on the ground and an oscillation occurs in the steering mechanism (S1-S4).

According to this embodiment, the damping force increases after the steering mechanism starts oscillating. Therefore, it is possible to suppress the vibration of the steering mechanism after the wheelie landing, while suppressing the occurrence of the swing of the vehicle body and the unnatural vehicle body behavior and improving the riding feeling.

2. In the above embodiments, the control unit determines whether the steering mechanism has started oscillating after the front wheel lands on the ground (S2), and controls the damping force such that the damping force increases, after a predetermined period of time has lapsed since a determination that the steering mechanism has started oscillating (S41, S42).

According to this embodiment, the damping force starts to increase after a predetermined period of time has lapsed since the occurrence of the first oscillation of the steering mechanism. Therefore, it is possible to further suppress the vibration of the steering mechanism after the wheelie landing, while further suppressing the occurrence of the swing of the vehicle body and the unnatural vehicle body behavior.

3. In the above embodiments, the straddle type vehicle further comprises a first detection unit (101a) configured to detect a rotation speed of the front wheel, and a second detection unit (102a) configured to detect a rotation speed of a rear wheel, wherein
the control unit determines that the steering mechanism has started oscillating, in a case where a difference in the rotation speed between the front wheel and the rear wheel becomes equal to or smaller than a threshold, based on detection results of the first detection unit and the second detection unit (S22).

According to this embodiment, it is possible to determine the start of the oscillation of the steering mechanism from a difference in the rotation speed between the front wheel and the rear wheel.

4. In the above embodiments, the control unit controls the damping force such that the damping force gradually increases.

According to this embodiment, the damping force gradually increases. Therefore, it is possible to increase the damping force, while a natural vehicle body behavior is being kept.

5. In the above embodiments, the straddle type vehicle further comprises a third detection unit (20a) capable of detecting a steering angle of the steering mechanism, wherein
the control unit controls the damping force such that the damping force increases, after the front wheel lands on the ground and the oscillation occurs in the steering mechanism, based on a detection result of the third detection unit (S413).

According to this embodiment, the damping force is controlled by the third detection unit, based on the information related to the steering angle. Therefore, it is possible to increase the damping force of the steering mechanism at a more effective timing.

6. In the above embodiments, the control unit controls the damping force such that the damping force increases, in a case where a steering angular velocity of the steering mechanism based on the detection result of the third detection unit satisfies a predetermined condition (S412, S413).

According to this embodiment, it is possible to increase the damping force of the steering mechanism at a more effective timing.

7. A control device (50) of the above embodiments is a control device to be applied to a straddle type vehicle (1), the straddle type vehicle including a steering mechanism (10) that steers a front wheel and a steering damper device (20) capable of variably generating a damping force working on a rotating action of the steering mechanism, the control device being configured to control the damping force of the steering damper device to increase, when the front wheel of the straddle type vehicle in a wheelie state lands on a ground, wherein the control device controls the damping force to increase, after the front wheel lands on the ground and an oscillation occurs in the steering mechanism (S1-S4).

According to this embodiment, the damping force increases after the steering mechanism starts oscillating. Therefore, it is possible to suppress the vibration of the steering mechanism after the wheelie landing, while suppressing the occurrence of the swing of the vehicle body and the unnatural vehicle body behavior.

The invention is not limited to the foregoing embodiments, and various variations/changes are possible within the spirit of the invention.

What is claimed is:

1. A straddle type vehicle comprising:
a steering mechanism configured to steer a front wheel;
a steering damper device capable of variably generating a damping force working on a rotating action of the steering mechanism; and
a control unit configured to control the damping force of the steering damper device to increase, when the front wheel of the straddle type vehicle in a wheelie state lands on a ground, wherein
the control unit controls the damping force to increase, after the front wheel lands on the ground and an oscillation occurs in the steering mechanism.

2. The straddle type vehicle according to claim 1, wherein the control unit determines whether the steering mechanism has started oscillating after the front wheel lands on the ground, and controls the damping force such that the damping force increases, after a predetermined period of time has lapsed since a determination that the steering mechanism has started oscillating.

3. The straddle type vehicle according to claim 2, further comprising a first detection unit configured to detect a rotation speed of the front wheel, and a second detection unit configured to detect a rotation speed of a rear wheel, wherein
the control unit determines that the steering mechanism has started oscillating, in a case where a difference in the rotation speed between the front wheel and the rear wheel becomes equal to or smaller than a threshold, based on detection results of the first detection unit and the second detection unit.

4. The straddle type vehicle according to claim 1, wherein the control unit controls the damping force such that the damping force gradually increases.

5. The straddle type vehicle according to claim 1, further comprising a third detection unit capable of detecting a steering angle of the steering mechanism, wherein
the control unit controls the damping force such that the damping force increases, after the front wheel lands on the ground and the oscillation occurs in the steering mechanism, based on a detection result of the third detection unit.

6. The straddle type vehicle according to claim 5, wherein the control unit controls the damping force such that the damping force increases, in a case where a steering angular velocity of the steering mechanism based on the detection result of the third detection unit satisfies a predetermined condition.

7. A control device to be applied to a straddle type vehicle, the straddle type vehicle including a steering mechanism that steers a front wheel and a steering damper device capable of variably generating a damping force working on a rotating action of the steering mechanism, the control device being configured to control the damping force of the steering damper device to increase, when the front wheel of the straddle type vehicle in a wheelie state lands on a ground, wherein
the control device controls the damping force to increase, after the front wheel lands on the ground and an oscillation occurs in the steering mechanism.

* * * * *